US012166656B2

(12) United States Patent
dos Santos et al.

(10) Patent No.: US 12,166,656 B2
(45) Date of Patent: Dec. 10, 2024

(54) ITERATIVE DEVELOPMENT OF PROTOCOL PARSERS

(71) Applicant: FORESCOUT TECHNOLOGIES, INC., San Jose, CA (US)

(72) Inventors: Daniel Ricardo dos Santos, Eindhoven (NL); Elisa Costante, Eindhoven (NL)

(73) Assignee: Forescout Technologies, Inc., San Jose, CA (US)

( * ) Notice: Subject to any disclaimer, the term of this patent is extended or adjusted under 35 U.S.C. 154(b) by 0 days.

(21) Appl. No.: 18/235,240

(22) Filed: Aug. 17, 2023

(65) Prior Publication Data

US 2023/0396527 A1 Dec. 7, 2023

Related U.S. Application Data

(63) Continuation of application No. 17/557,769, filed on Dec. 21, 2021, now Pat. No. 11,777,832.

(51) Int. Cl.
*G06F 15/173* (2006.01)
*H04L 43/04* (2022.01)
*H04L 43/18* (2022.01)

(52) U.S. Cl.
CPC .............. *H04L 43/18* (2013.01); *H04L 43/04* (2013.01)

(58) Field of Classification Search
CPC .................................. H04L 43/18; H04L 43/04
See application file for complete search history.

(56) References Cited

U.S. PATENT DOCUMENTS

| 2004/0088425 | A1  |  5/2004 | Rubinstein et al. |
| 2006/0280178 | A1* | 12/2006 | Miller ............... H04L 69/22 370/389 |
| 2007/0083644 | A1* |  4/2007 | Miller ............... H04L 43/18 709/224 |
| 2011/0103238 | A1* |  5/2011 | Monk ................ H04L 49/90 370/252 |
| 2012/0210426 | A1  |  8/2012 | Yu |

(Continued)

FOREIGN PATENT DOCUMENTS

CN  111585832 A  8/2020

OTHER PUBLICATIONS

Guihéry, Frédéric, "Tutorial: How to reverse unknown protocols using Netzob", Nov. 13, 2015, Amossys, Rennes, France.

(Continued)

*Primary Examiner* — Duyen M Doan
(74) *Attorney, Agent, or Firm* — Womble Bond Dickinson (US) LLP

(57) ABSTRACT

Systems, methods, and related technologies for determining fields of an unknown protocol are described. Network traffic capture is grouped into one or more clusters of packets based on similarity. Each of the one or more clusters are parsed to identify one or more fields of an unknown protocol. The network traffic capture is modified, including annotating the identified one or more fields of the unknown protocol. A protocol parser is generated without user input, including parsing each of the annotated one or more fields of the unknown protocol to generate a description of the unknown protocol comprising identified one or more fields of the unknown protocol and an order of the identified one or more fields of the unknown protocol, and compiling the description into the protocol parser.

20 Claims, 6 Drawing Sheets

(56) References Cited

U.S. PATENT DOCUMENTS

| | | |
|---|---|---|
| 2012/0236756 A1 | 9/2012 | Bennett et al. |
| 2013/0227519 A1* | 8/2013 | Maleport ................ H04L 43/12 |
| | | 717/106 |
| 2014/0258779 A1* | 9/2014 | Kaler .................... G06F 21/552 |
| | | 714/28 |
| 2015/0215429 A1* | 7/2015 | Weisblum ............. H04L 67/535 |
| | | 370/475 |
| 2016/0197852 A1 | 7/2016 | Hutchison et al. |
| 2022/0206473 A1 | 6/2022 | Qiu et al. |

OTHER PUBLICATIONS

Jiang et al. "A Text Similarity-based Protocol Parsing Scheme for Industrial Internet of Things", May 5, 2021, IEEE 24th International Conference on Computer Supported Cooperative Work in Design (CSCWD), Dailan, China.
International Search Report and Written Opinion of Application No. PCT/US2022/052171, mailed Mar. 28, 2023, 20 pages.

* cited by examiner

ITERATIVE DEVELOPMENT OF PROTOCOL PARSERS

CROSS REFERENCE TO RELATED APPLICATIONS

This application is a continuation of U.S. application Ser. No. 17/557,769 filed Dec. 21, 2021, the contents of which is hereby incorporated by reference in its entirety.

TECHNICAL FIELD

Aspects and implementations of the present disclosure relate to network monitoring, and more specifically, to iterative development of protocol parsers.

BACKGROUND

A computer network can include computing devices that communicate with each other using agreed upon communication protocols. The computing devices can be communicatively coupled to each other over physically wired, optical, or wireless radio-frequency technology. A computer network can have a variety of network topologies. Communications between devices on a network can be referred to as network traffic. Communications can be sent as data packets. Each data packet may have an agreed upon format, which may be understood as a protocol. As technology advances, the number and variety of devices that are connected or coupled to communications networks are rapidly increasing. Communication protocols used by each device may have different message formats.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
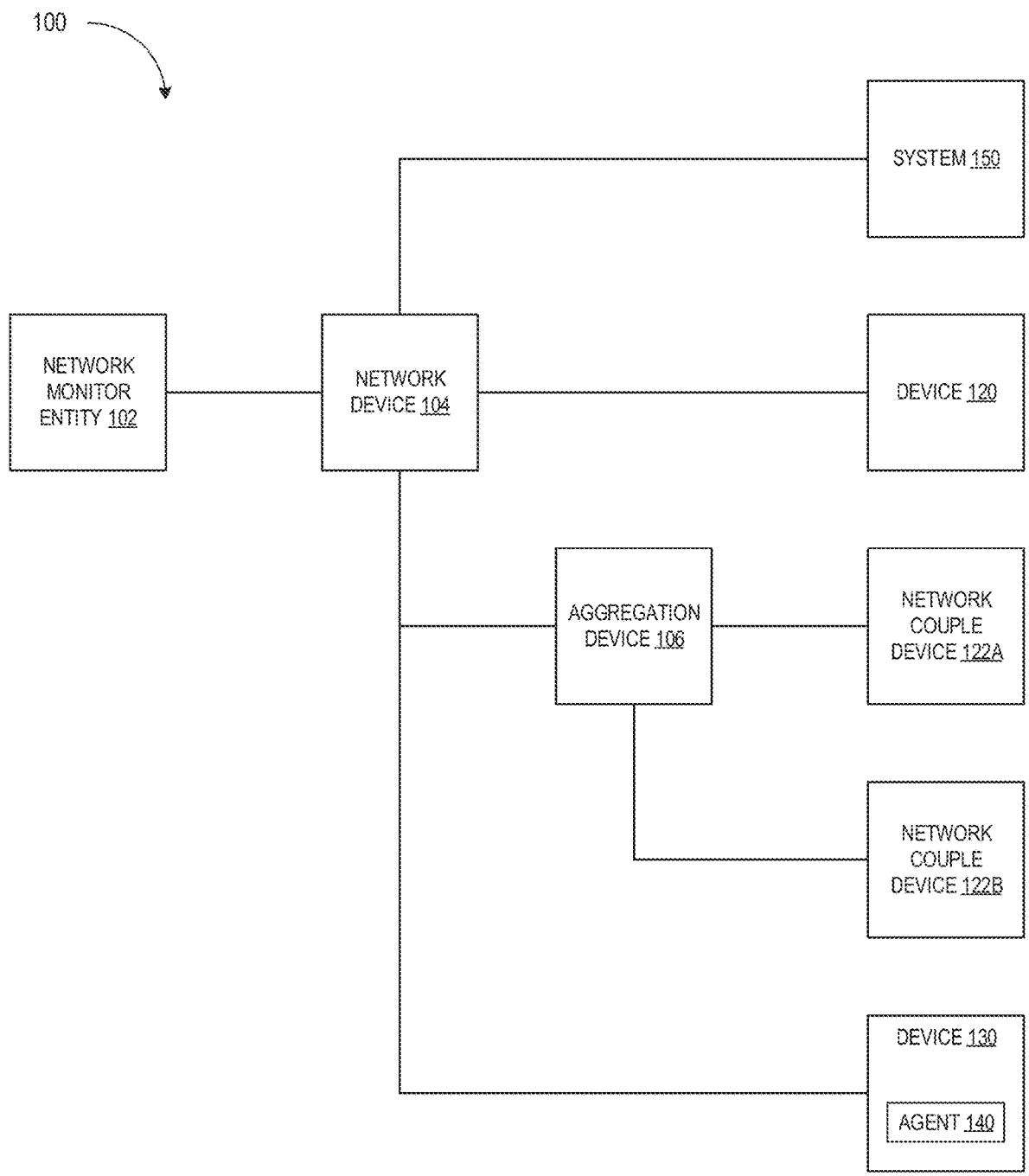
FIG. 1 depicts an illustrative communication network in accordance with one implementation of the present disclosure.

Aspects and implementations of the present disclosure are directed to mapping network traffic in an agentless manner. The systems and methods disclosed can be employed with respect to network security, among other fields.

Network traffic capture can include captured communications to and/or from devices on a network. Each communication from or to a device can be captured as a one or more packets of data. Such packets can have a header and payload which can vary in format depending on which communication protocol is used. For example, a heart monitor that communicates on a network may send out a message periodically that includes a heartbeat rate, a patient ID, or other related information. A networked thermometer may communicate a message every minute that includes temperature, a location of the thermometer, a timestamp, or other related information. A network traffic capture may include many such communications over a given period of time on a given network. The network traffic capture may include a file (e.g., a packet capture (PCAP) file, or a data stream). Network traffic capture can provide useful information about what each device is doing on a network. A network protocol parser may be used to decode a communication from a given device, with knowledge of the message format from the device. In some cases, however, the message format of one or more packets may not be known.

Protocol parsers may include software, hardware, or a combination thereof that extract fields of interest out of network packets of a specific protocol. These parsers may be used for many applications in cybersecurity, including network security monitoring, forensic analysis, and obtaining detailed information about devices communicating over a network (e.g., device visibility for asset inventory). A protocol parser can be manually created for a protocol that has a published specification document (e.g., standard IT protocols such as Hyper Text Transfer Protocol (HTTP) and file transfer protocol (FTP)). The documentation may specify each of the fields, the formats of each field, the order, header information, and other message format information. In such a case, a developer may read the document and write software instructions to decode each field of a given packet, while recognizing the packet based on header information or other identifiers. For some proprietary protocols, however, such specification may not exist or is not publicly available. This may be especially prevalent in operational technology (OT) and internet of things (IoT) applications. Therefore, the developer may not know immediately what parts of the traffic are of interest and may have difficulty recognizing a protocol within the network. For these proprietary protocols, or other unknown protocols, a process that may be referred to as protocol reverse engineering may be undertaken to create a parser.

Under existing solutions, there are generally two options for network protocol reverse engineering. Under a first option, an analyst reverse engineers a proprietary software application that is used to create and parse network packets of that protocol. The analyst may look at software instructions to determine fields in a packet. Under a second option, an analyst may study network traffic captures, such as PCAPs, that include packets that have been constructed with the unknown protocol. Although the first option may provide an easier and better understanding of the protocol, these software applications may be proprietary or otherwise difficult to obtain. Further, reverse engineering software applications may be time consuming and difficult, depending on how complicated the software is. In some cases, reverse engineering from network traffic captures may be the only or best option. These network traffic captures may be obtained from different sources, e.g., interacting directly with a device that uses the protocol, monitoring a network where such a device is present, or obtaining traffic captures from the Internet.

To reverse engineer a protocol from network traffic capture, an analyst may manually sift through the network traffic capture and identify the packets of interest in the traffic capture, such as which packets use the unknown protocol of interest. This manual process is very costly because the analyst must comb through a large volume of data, which in some cases is not human-readable (e.g., for binary protocols), while trying to identify patterns or other recognizable features that may help uncover the structure of the protocol.

Accordingly, systems, methods, techniques, and related technologies are described herein in various implementations that may use an automated or a semi-automated iterative process to develop protocol parsers. Such a system may be supported by an extensible network monitoring tool and automated statistical analysis. The system may greatly reduce an analyst's effort of creating and maintaining a parser for proprietary network protocols, especially for protocols where it is difficult or impossible to obtain a software application for reverse engineering, or for a hardware device that is deployed in a lab environment.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, or other network components or devices may be used to enforce segmentation on a network (and different address subnets may be used for each segment). Enforcement points may enforce segmentation by filtering or dropping packets according to the network segmentation policies/rules.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor entity 102, devices 120 and 130, and network coupled devices 122a-b. Network device 104 may be one or more network switches, access points, routers, firewalls, hubs, etc.

Network monitor entity 102 may be operable for a variety of tasks including obtaining and parsing network traffic capture to provide protocol suggestions for creating a protocol parser. In some embodiments, network monitor entity 102 can use local resources (e.g., processing, memory, data resources, or other resources), cloud resources, or a combination thereof for obtaining the network traffic capture and providing the protocol suggestions. In various embodiments, various libraries may be used to obtain the network traffic capture, parse it, and modify the network traffic capture to identify one or more fields of an unknown protocol, as discussed in more detail below.

Network monitor entity 102 can determine one or more enforcement points where the device is communicatively coupled to the network and thereby determine the one or more enforcement points closest to the device. For example, network monitor entity 102 may access information on a switch (e.g., a switch cache) to determine a port (e.g., physical port, wireless port, or virtual port) where a device with a particular IP address or MAC address or other identifier is communicatively coupled. Network monitor entity 102 may also access information from a wireless access point where the device is communicatively coupled. In some embodiments, network monitor entity 102 may poll information from a cloud service to determine where a device is communicatively coupled or connected to a network. In various embodiments, network monitor entity 102 access syslog or SNMP information from a device itself to determine where a device is communicatively coupled or connected to a network (e.g., without accessing information from a network device or enforcement point). Network monitor entity 102 supports applying access policies in situations where a device is communicatively coupled to a network with more than one connection (e.g., a wired connection and a wireless connection).

Based on the enforcement point, network monitor entity 102 may determine the one or more access rules to be assigned to the one or more enforcement points based on an access policy. In some embodiments, based on information about the one or more enforcement points closest to the device, network monitor entity 102 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 102 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 102 may then apply or assign the access rules to the one or more enforcement points closest to the device. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Network monitor entity 102 may provide an interface (e.g., a graphical user interface (GUI)) for viewing, monitoring, and modifying classification or associated thresholds associated one or more models. Network monitor entity 102 may further monitor network traffic over time to reclassify entities as new entities join the network, entities rejoin the network, and new models are made available.

Network monitor entity 102 may further perform a variety of operations including identification, classification, and taking one or more remediation actions (e.g., changing network access of a device, changing the virtual local area network (VLAN), sending an email, sending a short message service (SMS) message, etc.).

Network monitor entity 102 may also parse network traffic. For example, the network monitor entity 102 may parse (e.g., read, analyze, access, etc.) different protocol fields of the network traffic (e.g., packets, messages, frames, etc.). The network monitor entity 102 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 102 may include a parser and one or more processing engines, as described herein.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an application programming interface (API), command line interface (CLI), web interface, simple network management protocol (SNMP), etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or third party systems (e.g., system 150) may further be used for determining one or more tags or characteristics for a device. For example, a vulnerability assessment (VA) system may be queried to verify or check if a device is in compliance and provide that information to network monitor entity 102. External or third party systems may also be used to perform a scan or a check on a device to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor entity 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122*a-b*. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 106 may be configured to communicate with network coupled devices 122*a-b* and provide network access to network coupled devices 122*a-b*. Aggregation device 106 may further be configured to provide information (e.g., operating system, device software information, device software versions, device names, application present, running, or both, vulnerabilities, patch level, etc.) to network monitor entity 102 about the network coupled devices 122*a-b*. Aggregation device 106 may be a wireless access point that is configured to communicate with a wide variety of devices through multiple technology standards or protocols including, but not limited to, Bluetooth™, Wi- Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor entity 102. It is appreciated that log information may be particularly reliable for stable network environments (e.g., where the types of devices on the network do not change often). The log information may include information of updates of software of network coupled devices 122a-b.

Figure 2:
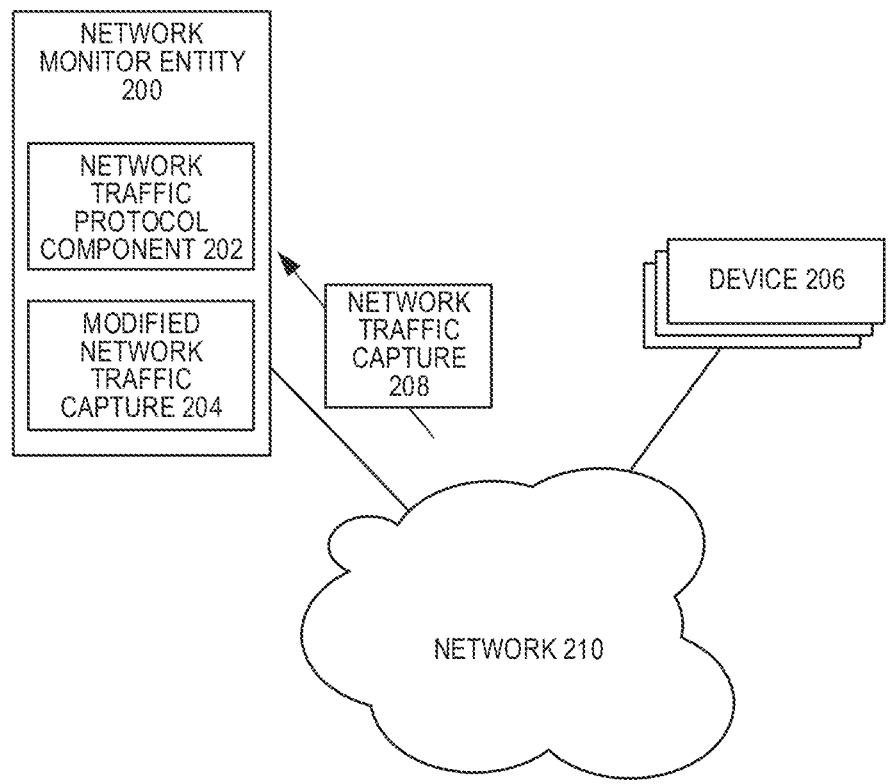
FIG. 2 depicts an illustrative computer network with a network traffic protocol component in accordance with one implementation of the present disclosure.

FIG. 2 depicts an illustrative computer network with a network traffic protocol component in accordance with one implementation of the present disclosure. One or more of devices 206 may communicate with each other over a network 210. These devices may include computer servers, IoT devices (e.g., a television, sensors, appliances, medical equipment, exercise equipment, or other IoT device), personal computers, mobile phones, tablet computers, one or more entities, and more. Communications over the network 210 may be monitored and captured as a network traffic capture 208 by devices 206, network monitor entity 200, network infrastructure (e.g., a switch, firewall, or other network device), or a combination thereof. In some variations, a device may monitor and capture network traffic 208 using a network monitoring application which may also be referred to as a packet analyzer or packet sniffer. The monitoring application may capture traffic by intercepting each packet on the network, logging the packet (e.g., as a file, in a file, etc.), and passing the packet along towards its destination. In some examples, a monitoring application may utilize a 'PCAP' application programming interface (API) to capture the network traffic.

Network monitor entity 200 may be communicatively coupled to the network. Network monitor entity 200 may include a network traffic protocol component 202. This component 202 may obtain the network traffic capture 208 from the network 210. In some aspects, network traffic capture 208 may be obtained automatically, e.g., with a service or application running on a device that aggregates the traffic and sends it to the network monitor entity. Additionally, or alternatively, network traffic may be obtained on network monitor entity 200 through non-network paths. For example, a user may use portable memory such as, for example, a universal serial bus (USB) flash drive, a micro security digital (SD) memory card, or other portable memory, to put, load, etc., the network traffic capture 208 into the network monitor entity 200. Network traffic protocol component may include software and/or hardware that may run on network monitor entity as a tool, a background service, or other application.

The network traffic capture 208 may include data packets that are communicated over the network 210. Network traffic may include, for each data packet, a number, a time that the packet is in transit, a source, a destination, a protocol type (e.g., user datagram protocol (UDP), transmission control protocol (TCP), domain name system (DNS), etc.), a length, a source and/or destination port, or other information. Overall, the network traffic capture may contain a large mix of packets with different sources, different destinations, and/or different protocols. Some of the packets may have a known protocol, such as, for example, internet control message protocol version 6 (ICMPv6), address resolution protocol (ARP), internet control message protocol version 3 IGMPv3, and other protocols that follow a known structure. Other protocols, such as UDP or TCP, may abide by high level transport layer rules, however, the application-level structure such as what fields are present, the format for each field, length of each field, order of fields, and so on, may vary from one packet to another. For example, devices 206 may include an IoT thermometer that communicates information on the network periodically over TCP or UDP. The manufacturer for the IoT device may decide which fields are present, and in what order, such as, for example, time, date, temperature, and fault status. Devices 206 may further include medical equipment that periodically sends out a message on the network 210 with different fields. Given the vast number of different network-connected devices, the format of the data packet (e.g., the order and type of each field, etc.) from many of devices 206 may not be known or vary in unknown ways.

The network traffic protocol component 202 may remove one or more packets from the network traffic capture in response to the one or more packets having a known protocol. For example, the network traffic protocol component 202 may remove all packets that follow a known structure, such as, for example, ICMPv6, ARP, IGMPv3, or other packets with known message types. A known message type may have a standardized and known order of fields. For example, the format for each field (e.g., a string, 32-bit integer, 16-bit integer, a name, a constant value, a variable length field, etc.), as well as the order in which they are present a given message, may be an agreed upon convention. By removing such packets from the network traffic capture 208, the remaining packets in network traffic capture 208 includes packets with unknown protocols. In such a manner, the data set may be reduced to improve efficiency for statistical analysis of the remaining data.

The network traffic protocol component 202 may group the network traffic capture 208 that contains the packets having one or more unknown protocols, into one or more clusters of packets. These packets may be grouped based on similarity. Clustering may help the network traffic protocol component 202 to identify different message types within a protocol (e.g., requests and responses) based on packet lengths or to identify protocols that use a range of dynamic ports.

In some examples, the network traffic may be grouped based on having a common layer 4 protocol type, such as UDP, TCP, Netbios frames (NBF), network basic input/output system (NetBIOS), fiber channel protocol (FCP), encapsulating security protocol (ESP), datagram congestion control protocol (DCCP), or other layer 4 protocol types, recognizing that an unknown protocol is unlikely to use different layer 4 protocol types.

Additionally, or alternatively, the network traffic may be grouped based on a common frequency of communication or time of communication. For example, packets that are sent out every 30 minutes, or those sent out at 5 pm every day, may be grouped together because this may indicate that these packets share a common or similar protocol.

Additionally, or alternatively, the network traffic may be grouped based on a common port number. For example, all packets that use port '24105' may be grouped together. This may also indicate that these packets share a common or similar protocol, because devices that use the same port may be programmed as such by a common manufacturer, with a common purpose, or a combination thereof.

Additionally, or alternatively, the network traffic may be grouped based on a common packet length. For example, all packets having a length of 208 bytes may be grouped into the same cluster. This too may indicate that the packets share a common or similar protocol, for example, because protocols with the same or similar structure may be likely to have the same length.

The network traffic protocol component 202 may parse each of the one or more clusters to identify one or more fields of an unknown protocol. For example, the network traffic protocol component 202 may apply statistical analysis, a specialized reverse engineering tool, or combination thereof on packet content, byte by byte, to identify one or more features that may be used to model fields of an unknown protocol. In some examples, the network traffic protocol component 202 may identify what data positions remain constant, such as, for example, when the same positions in the data are consistently observed with the same value in a cluster. In some examples, the component may identify what positions are clear-text or a string, for example, when a sequence of at least 4 human-readable characters are detected in the cluster. In some examples, the component may identify whether a position in packets of a cluster has a limited range of values, which may indicate the presence of a sequential counter. In some examples, a repeating constant value or string may be detected in packets of a cluster. Each of these detected features may be used by the network traffic protocol to reverse engineer the structure of an unknown protocol, which may in turn, be used to develop a parser for the unknown protocol, as described herein.

In some examples, an API of a field modeling tool such as, for example, NetZob or another field modeling tool may be used to identify the features. For example, the network traffic component 202 may call upon a field modeling tool to parse each of the one or more clusters and identify features such as a string, an integer, a timestamp, a constant repeating value or string, a counter, or other feature of a protocol. As discussed, due to the grouping of packets into clusters, identification of fields may be more efficient and successful.

The network traffic protocol component 202 may modify the network traffic capture, including annotating the one or more fields of the unknown protocol. For example, each field of an unknown protocol may be circled, highlighted, made bold, underlined, or other symbolic or visual indication may be provided to emphasize these identified fields to a user. These fields may be stored and/or presented in the context of the remaining network traffic capture (e.g., with remaining unknown fields of clustered data) to give context to where the fields are and what is known and what is not known for a given protocol.

In some examples, the network traffic protocol component 202 may generate a protocol trace for the unknown protocol for which the fields have been generated. In some instances, the network traffic protocol component 202 may identify fields for multiple unknown protocols. In such a case, the network traffic protocol component 202 may generate a protocol trace for each of the unknown protocols. In some examples, each trace may be generated as a separate file. Alternatively, or additionally, the traces may reside within a common file and delineated through formatting. A user (e.g., an analyst) may refer to a particular trace to help reverse engineer a particular unknown protocol.

Further, the network traffic protocol component 202 may store each trace that is associated with a particular unknown protocol in computer-readable memory, such as, for example, non-volatile computer-readable memory. The network traffic protocol component may refer to the trace in future iterations with the same or different network capture data, to build on a given unknown protocol. The structure of an unknown protocol may iteratively be determined, field by field, until deemed to be complete or satisfactory. Network traffic protocol component 202 may analyze how much of an unknown protocol is identified (e.g., 65%, 80%, etc.). In response to a threshold amount of the fields being identified in an unknown protocol, network traffic protocol component 202 may generate a notification or alert to a user. In some aspects, network traffic protocol component 202 may, in future iterations of parsing network traffic capture, discard packets of known protocols that were previously unknown, thus improving efficiency and directing efforts towards unknown protocols.

Figure 3:
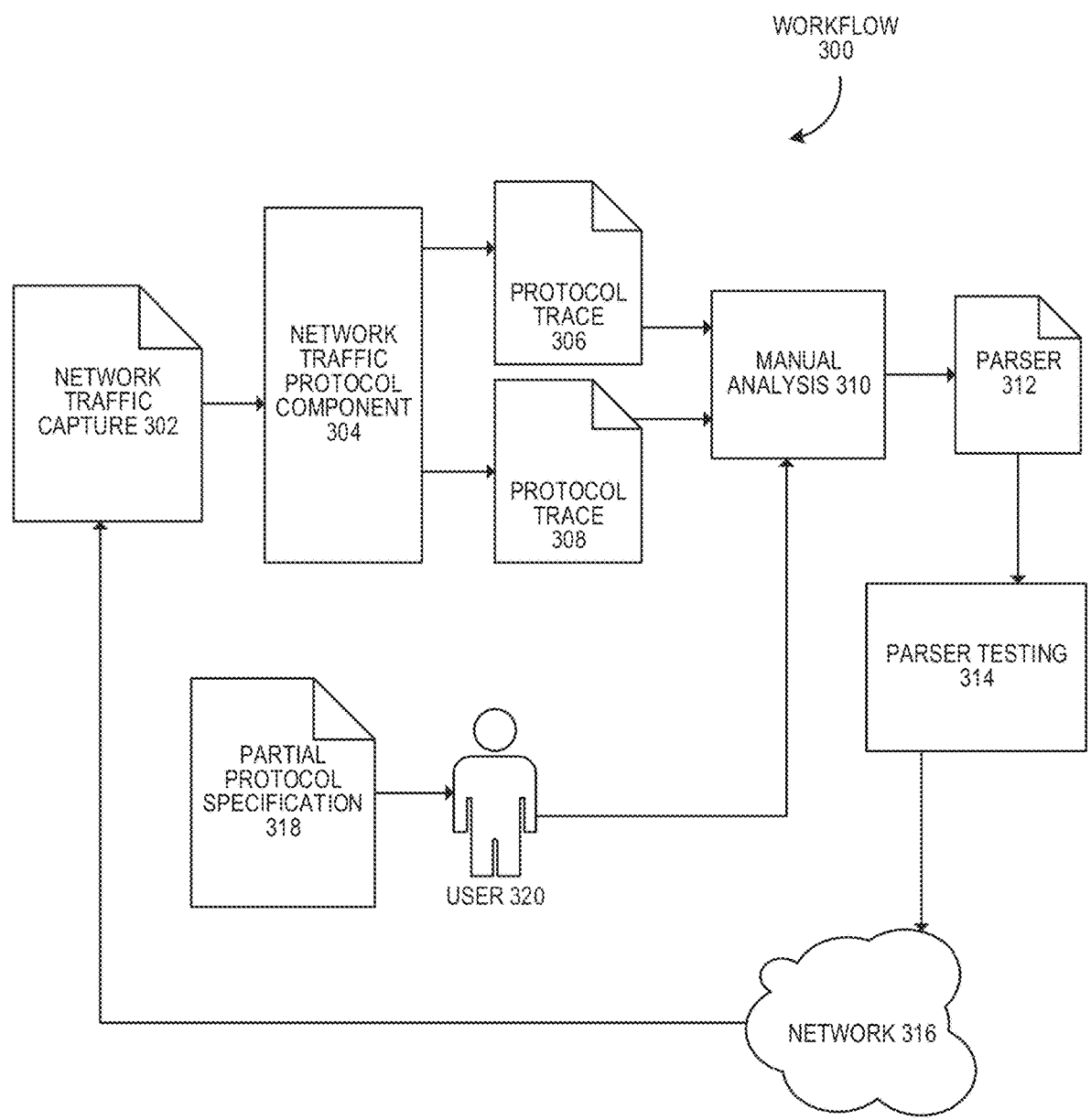
FIG. 3 depicts an illustrative workflow for iterative protocol development in accordance with one implementation of the present disclosure.

FIG. 3 depicts an illustrative workflow 300 for iterative protocol development in accordance with one implementation of the present disclosure. Network traffic capture 302 may be obtained or accessed by network traffic protocol component 304. Component 304 may perform the operations described with respect to network traffic protocol component 202. Component 304 may generate one or more protocol traces 306, 308, for each of the unknown protocols detected in network traffic capture 302. Each protocol trace may include highlighted fields of a respective unknown protocol, as identified and annotated by network traffic protocol component 304 (e.g., as described herein).

A user 320 (e.g., an analyst) may, at block 310, perform manual analysis on the protocol traces. For example, the user may observe the trace (which may also include the clustered network traffic) to find suggestions such as, for example, each of the highlighted fields of a given unknown protocol. The clustering of the network traffic packets may make the user's job more efficient and help the user identify the underlying structure of the unknown protocol.

In some cases, the analyst may have access to a partial protocol specification 318 that the analyst may leverage to help fill in some of the unknown fields of the unknown protocol. In some examples, the partial parser may be generated as a result of a previous iteration of the workflow 300. The analyst may develop a parser 312 for each of the protocol traces 306, 308. In some examples, the parser may be generated as a plugin (e.g., a Lua plugin) or script.

At block 314, the parser 312 can be tested. The parser 312, which may be plugin, may be run through an extensible network monitoring tool such as, for example, eyeInspect, eyeSight, both available from Forescout Technologies, Inc. of San Jose, California, Wireshark or other equivalent technology. The parser 312, which may be a partial parser, can be applied to parsing packets on test deployments such as, for example, in lab setups, real customer networks or with design partners. In some examples, the parser 312 may be applied to additional network traffic captures that may be obtained with web crawlers. For example, a web crawler may be used to search for network traffic captures that are made available to the public on the internet, such as, for example, PacketTotal. These network traffic captures that are obtained from test deployments or through web crawlers may be stored on the network 316 and may beneficially contain additional fields of the unknown protocols that were not explored or identified in a previous iteration of workflow 300. Thus, with each iteration of the workflow 300, which may use modified or additional network traffic capture 302, a parser 312 may be generated that is closer to a complete one and/or captures each field of interest. The workflow 300 may exit when the parser is deemed complete enough or when no new information can be gathered from test deployments or other sources. In some examples, the parser may be deemed to be complete when a threshold is satisfied, such as, for example, a number of fields that are identified, a percentage of the fields in a protocol that are identified, or a combination thereof.

In some examples, some or all of the blocks such as block 314, block 310, or both, may be automated and integrated as part of the network traffic protocol component 304. For example, the network traffic protocol component may automatically implement a web crawler that obtains the network traffic capture 302 from the network 316, which may be connected to the internet. Additionally, or alternatively, the network traffic protocol component may include a web-based application that is presented to one or more users as a background service or a user-interface application. The web-based application may receive and aggregate network traffic from the users, to generate network traffic capture 302.

Similarly, generation of the parser 312 may be performed automatically, such as by network traffic protocol component 304 or 202. For example, network traffic protocol component 304 may generate a description of an unknown protocol and apply a parser generator tool to this description. The description may be generated as an attribute grammar that describes the syntax and semantics of an unknown protocol using an agreed upon unified language. The description may include the identified fields of the unknown protocol and the order of such fields in an unknown protocol. The parser generator tool may compile the description into a protocol parser 312, which may be a complete or incomplete protocol parser. In some examples, the parser generator tool may include tools such as Spicy or Zeek to read and compile the description into a useable parser 312.

As discussed, the workflow 300 may be repeated to continue to flesh out an unknown protocol. In some examples, network traffic protocol component 304 may store the one or more fields of the unknown protocol in computer-readable memory. The network traffic protocol component may refer to this partially determined protocol in future iterations, and modify the network traffic capture by annotating additional one or more fields of the unknown protocol. As such, with each iteration, the unknown protocol may be fleshed out more, until it is deemed to be satisfactory or complete. With each iteration, a protocol trace (e.g., 306, 308) may have more fields identified. At manual analysis 310, the user 320 may be given better suggestions in each of the protocol traces, with each iteration of the workflow.

In some variations, the network traffic protocol component 304 may present an alert to user 320 in response to the additional one or more fields of the unknown protocol being identified. For example, if, during a current iteration, an unknown protocol already had fields 'A', 'B', and 'C' identified in past iterations, the network traffic protocol component may trigger an alert that an additional field 'D' has been identified. If not, then no such alert may be made. An alert may be a symbolic or visual indicator which may be included in the protocol trace and/or provided as a separate notification (e.g., a pop-up notification, an email, a line item on a report, etc.).

Figure 4:
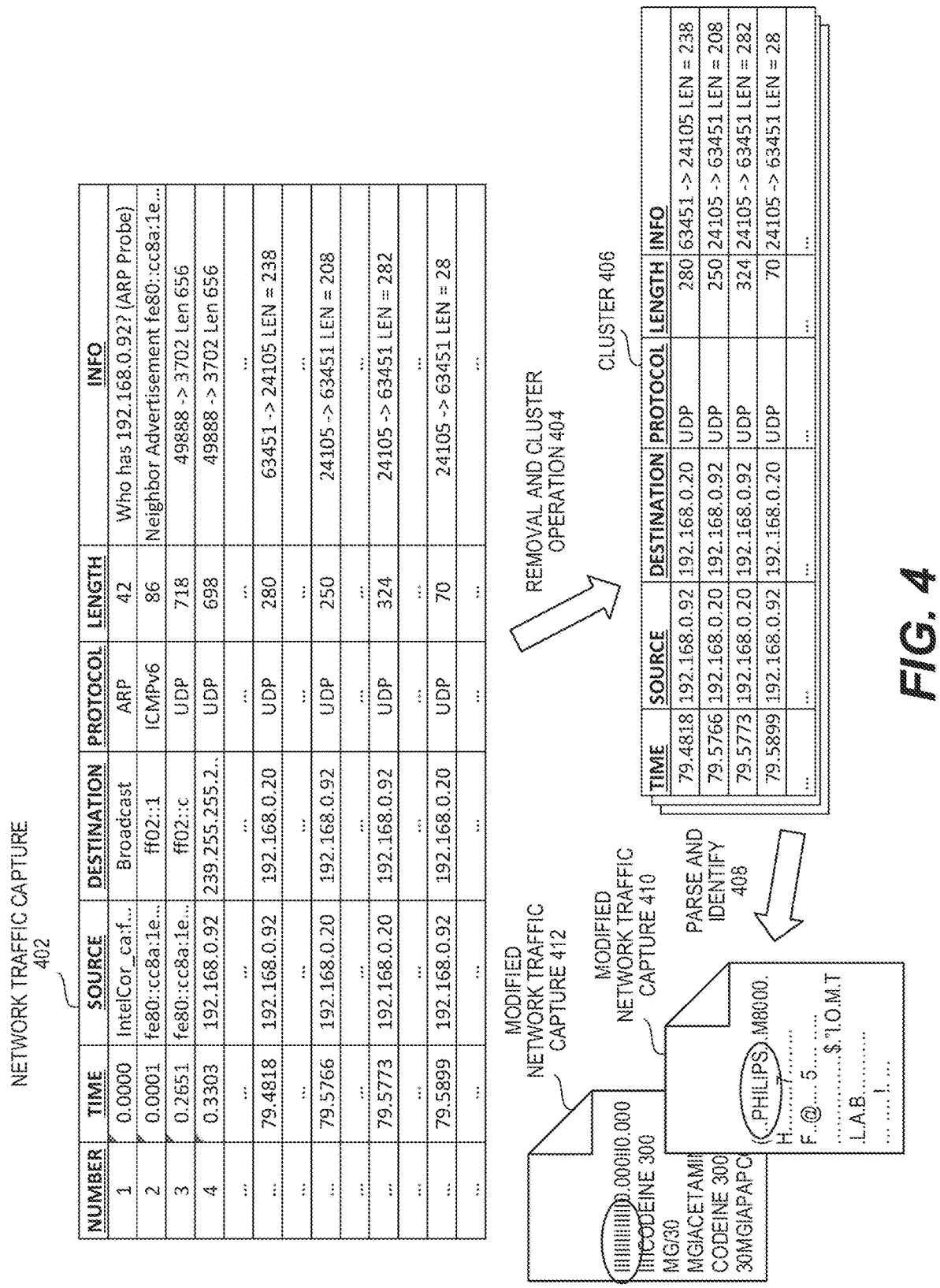
FIG. 4 depicts an example of network traffic capture and annotation thereof in accordance with one implementation of the present disclosure.

FIG. 4 depicts an example network traffic capture 402 in accordance with one implementation of the present disclosure. Network traffic capture 402 may be generated by a network monitoring tool such as Wireshark or other network monitoring tool. The capture may have packets with different protocols (e.g., UDP, TCP, ARP, ICMPv6, etc.). Each packet may have a time, source, destination, length, and other information (e.g., a source port, a destination port, payload length, or other information).

As discussed in other sections, at operation 404, processing logic may remove packets with known protocols from the network traffic capture, and cluster existing packets based on similarity. One or more clusters 406 may be generated, each having the grouped packets. For example, a cluster 406 may have packets that are grouped based on a UDP protocol and/or using port '24105' as shown under 'INFO'. Other clusters may be grouped based on using TCP protocol, payload length, total length, source address, destination address, frequency, time, and/or other features described.

At operation 408, processing logic may parse each of the clusters and identify fields of packets with unknown protocols. As mentioned, the packets with known protocols may be removed at block 404. Thus, the packets in the clusters at operation 408 have unknown protocols. Processing logic may annotate the identified fields to generate modified network traffic capture 410. In this example, a symbolic ASCII representation of each byte is shown. The bytes that do not have an ASCII representation may be shown with '.'. In modified network traffic capture 410, a constant string 'PHILIPS' may be identified as a repeating field in the packets of a cluster. Processing logic may annotate the field (e.g., with a circle, underline, highlighting, bold symbols, etc.). Other detected fields may also be annotated.

A user (e.g., an analyst) may observe the modified network traffic capture 410, which may include the clustered and annotated traffic. Rather than browse through raw data, the user may observe this clustered and annotated traffic and make a partial or complete parser with improved accuracy and efficiency.

In some examples, each cluster may have a modified network traffic capture. For example, a second of one or more clusters 406 may be clustered based on sharing a common layer 4 protocol type and port number (e.g., TCP and port 56926.) A second modified network traffic capture 412 may be annotated for this second cluster 410. This second modified network traffic capture may indicate that a protocol uses dynamic ports (other traces using different port numbers have been omitted for simplicity) but has a characteristic syntax with a constant number of pipes (the "|" character).

In this example, based on the suggestions of the tool, the analyst may be able to create two parsers. Modified network traffic capture 410 identifies a protocol that uses UDP port 24105 and has the keyword "PHILIPS" on some packets. This may allow the analyst or an automated tool to perform some optional discovery. For example, after some open source intelligence search, an analyst may discover that this packet is created using the Philips Data Export protocol which is used by devices such as IntelliVue Patient Monitors and Avalon Fetal Monitors. This protocol may have documentation available online, which the analyst may obtain to create a complete parser. An analyst may generate an initial parser for a second protocol based on the pipe field of modified network traffic capture 412. This second parser may be applied to more network traffic and help identify more fields for future iterations. For example, subsequent iterations with aid from the parser may confirm suspicions about the values of the fields such as, for example, that some fields may represent drugs, quantities, names of doctors, patients, or other related information.

Figure 5:
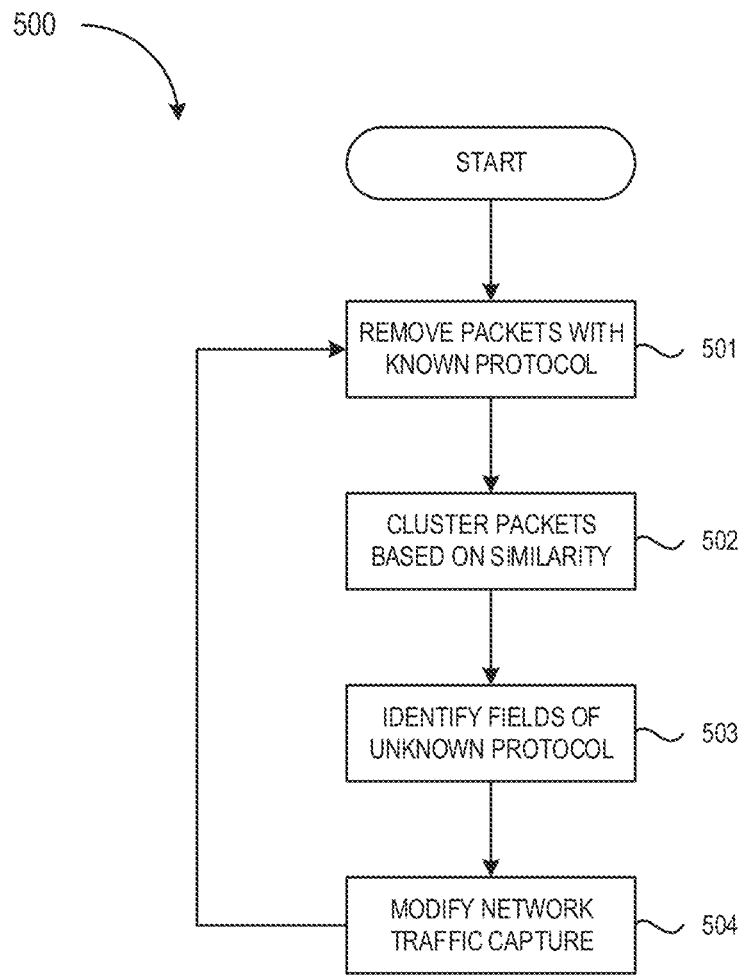
FIG. 5 depicts a process for determining fields of an unknown network traffic protocol in accordance with one implementation of the present disclosure.

FIG. 5 depicts a process for modeling an unknown network traffic protocol in accordance with one implementation of the present disclosure.

Some or all of process 500 may be performed by one or more components (e.g., components of system 600) of an entity or device, such as, for example, network monitor entity 102, network monitor entity 200, network traffic protocol component 202, or network traffic protocol component 304.

At block 501, the process includes removing one or more packets from a network traffic capture in response to the one or more packets having a known protocol. As discussed, the network traffic capture may include a mix of different message types, some with unknown protocols, and some with known protocols. Those with the known protocols may be removed which reduces the size of the network traffic capture.

At block 502, the process includes grouping the network traffic capture into one or more clusters of packets based on similarity. The packets may be clustered based one or more of: a frequency or time of communication, a port number, a layer 4 protocol type, a packet length, a shared field (e.g., a constant field), or other similarity, as discussed. In some aspects, multiple clusters may be formed. For example, there may be a cluster of packets that are sent as a UDP message, at a frequency of 1 Hz (e.g., once per second), and another cluster of packets that are sent as TCP messages, at a frequency of 1 Hz, and another cluster of packets of UDP messages that are sent at a frequency of 3 Hz (e.g., three times per second), and so on.

At block 503, the process includes parsing each of the one or more clusters to identify one or more fields of an unknown protocol. As discussed, certain fields may be reverse engineered and modeled using a tool such as NetZob to infer the message format of a protocol. Such a tool may include bio-informatic and grammatical inferring algorithms to detect fields of an unknown protocol. The process may sift through the clustered packets and detect patterns and field signatures, such as, for example, repeating constant values, known signatures for strings, integers, and other field types.

At block 504, the process includes modifying the network traffic capture including annotating the one or more fields of the unknown protocol. The network traffic capture may be annotated symbolically (e.g., with text), with a report format, and/or with visual indicators such as highlighting or circling. In some aspects, a dedicated protocol trace may be generated for each of the unknown protocols for which fields were detected.

The process may be repeated with additional network traffic capture. In some examples, the network traffic capture may be obtained automatically (e.g., through presenting a UI for users to upload network traffic). In some aspects, one or more network devices (e.g., network device 104) and/or aggregation device 106 may monitor a network, aggregate the traffic, and perform the process automatically.

Figure 6:
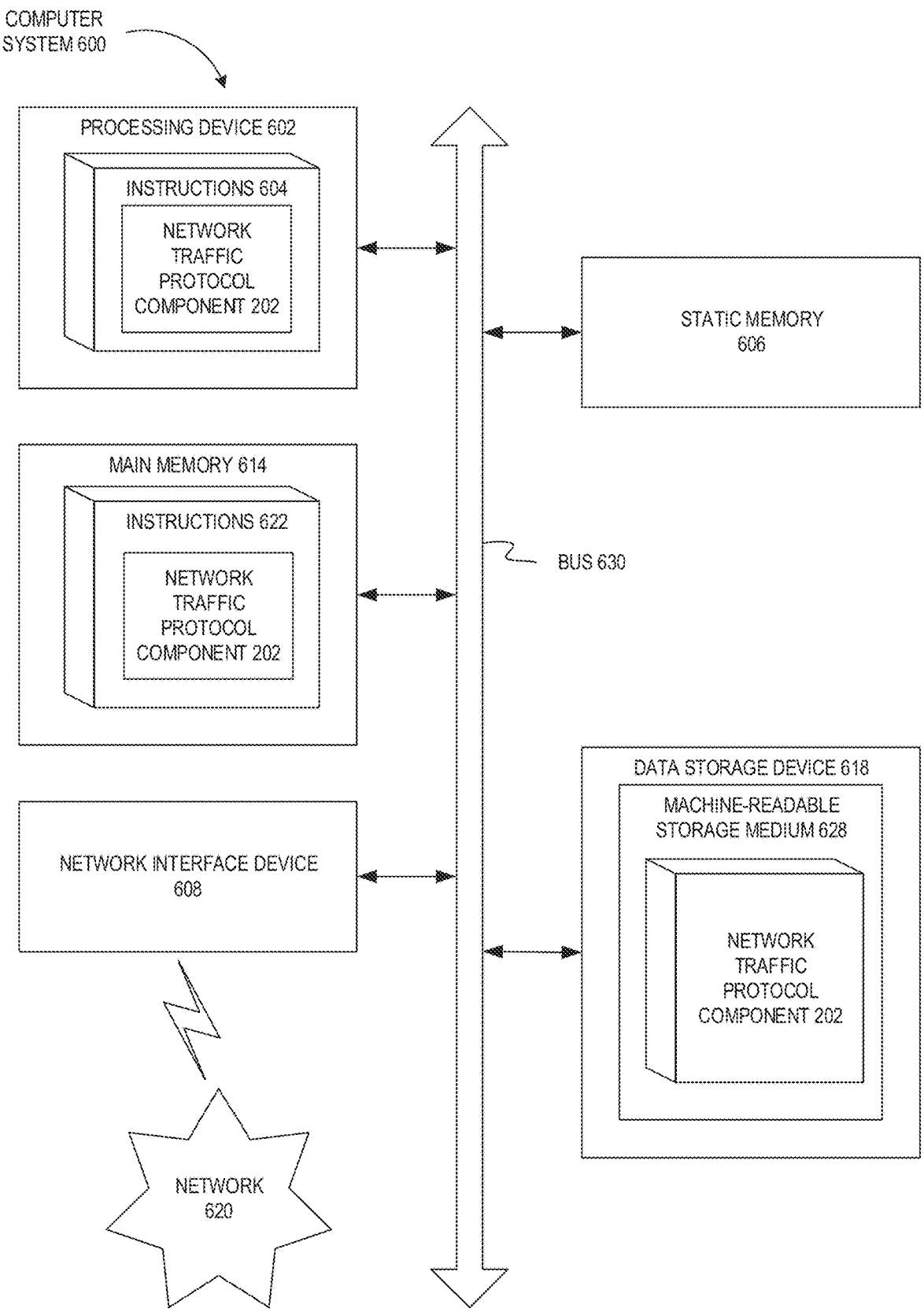
FIG. 6 is a block diagram illustrating an example computer system, in accordance with one implementation of the present disclosure.

FIG. 6 is a block diagram illustrating an example computer system 600, in accordance with one implementation of the present disclosure. This can be understood as a diagrammatic representation of a machine in the example form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server, such as network monitor entity 102 or 200 that runs a network traffic protocol component 202 or 304 to provide a modified network traffic capture or protocol traces as described herein.

The exemplary computer system 600 includes a processing device 602, a main memory 614 (e.g., read-only memory (ROM), flash memory, dynamic random access memory (DRAM)), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to network traffic protocol component 202, for performing the operations and steps discussed herein.

The data storage device 618 may include a machine-readable storage medium 628, on which is stored one or more set of instructions 622 (e.g., software) embodying any one or more of the methodologies of operations described herein, including instructions to cause the processing device 602 to execute network traffic protocol component 202. The instructions 622 may also reside, completely or at least partially, within the main memory 614 or within the processing device 602 during execution thereof by the computer system 600; the main memory 614 and the processing device 602 also constituting machine-readable storage media. The instructions 622 may further be transmitted or received over a network 620 via the network interface device 608.

The machine-readable storage medium 628 may also be used to store instructions to perform a method for obtaining and parsing network traffic capture, as described herein. The machine-readable storage medium 628 may also be used to store instructions to perform a method for modeling an unknown network traffic protocol, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions.

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
grouping network traffic capture into one or more clusters of packets based on similarity;
parsing each of the one or more clusters to identify one or more fields of an unknown protocol;
modifying the network traffic capture including annotating the identified one or more fields of the unknown protocol; and
generating, by a processing device, without user input, a protocol parser, including parsing each of the annotated one or more fields of the unknown protocol to generate a description of the unknown protocol comprising identified one or more fields of the unknown protocol and an order of the identified one or more fields of the unknown protocol, and compiling the description into the protocol parser.

2. The method of claim 1, wherein the network traffic capture is grouped based on commonality of one or more of: a host type, a frequency of communication, a time of communication, a port number, a network protocol layer, or a packet length.

3. The method of claim 1, wherein annotating the identified one or more fields is performed with a visual indicator.

4. The method of claim 1, wherein parsing each of the one or more clusters includes detecting a pattern of a repeating value.

5. The method of claim 4, wherein the repeating value is associated with a constant value.

6. The method of claim 1, wherein parsing each of the one or more clusters includes detecting a signature of a field type.

7. The method of claim 6, wherein the signature of the field type is associated with a string, an integer, or a timestamp.

8. The method of claim 1, wherein the network traffic capture is obtained using a web crawler.

9. The method of claim 1, wherein the method is performed in a first iteration to generate part of the protocol parser, and the method is repeated one or more second iterations to identify additional fields of the unknown protocol until the protocol parser satisfies a threshold.

10. The method of claim 9, wherein the threshold includes one or more of a number of the one or more fields that are identified, or a percentage of the one or more fields that are identified.

11. A system, comprising:
a memory; and
a processing device, operatively coupled to the memory, to:
group network traffic capture into one or more clusters of packets based on similarity;
parse each of the one or more clusters to identify one or more fields of an unknown protocol;
modify the network traffic capture including to annotate the identified one or more fields of the unknown protocol; and
generate, by the processing device, a protocol parser without user input, including to parse each of the annotated one or more fields of the unknown protocol to generate a description of the unknown protocol that comprises the identified one or more fields of the unknown protocol and an order of the identified one or more fields of the unknown protocol, and to compile the description into the protocol parser.

12. The system of claim 11, wherein the network traffic capture is grouped based on commonality of one or more of: a host type, a frequency of communication, a time of communication, a port number, a network protocol layer, or a packet length.

13. The system of claim 11, wherein to annotate the identified one or more fields is performed with a visual indicator.

14. The system of claim 11, wherein to parse each of the one or more clusters includes detecting a pattern of a repeating value.

15. The system of claim 14, wherein the repeating value is associated with a constant value.

16. A non-transitory computer readable medium having instructions encoded thereon that, when executed by a processing device, cause the processing device to:
group network traffic capture into one or more clusters of packets based on similarity;
parse each of the one or more clusters to identify one or more fields of an unknown protocol;
modify the network traffic capture including to annotate the identified one or more fields of the unknown protocol; and
generate, by the processing device, a protocol parser without user input, including: to parse each of the annotated one or more fields of the unknown protocol to generate a description of the unknown protocol that comprises the identified one or more fields of the unknown protocol and an order of the identified one or more fields of the unknown protocol, and to compile the description into the protocol parser.

17. The non-transitory computer readable medium of claim 16, wherein to parse each of the one or more clusters includes to detect a signature of a field type.

18. The non-transitory computer readable medium of claim 17, wherein the signature of the field type is associated with a string, an integer, or a timestamp.

19. The non-transitory computer readable medium of claim 16, wherein the network traffic capture is obtained using a web crawler.

20. The non-transitory computer readable medium of claim 16, wherein the instructions are performed in a first iteration to generate part of the protocol parser, and the instructions are repeated one or more second iterations to identify additional fields of the unknown protocol until the protocol parser satisfies a threshold.

* * * * *